United States Patent
Rand et al.

(10) Patent No.: US 12,081,656 B1
(45) Date of Patent: Sep. 3, 2024

(54) TECHNIQUES FOR CIRCUMVENTING PROVIDER-IMPOSED LIMITATIONS IN SNAPSHOT INSPECTION OF DISKS FOR CYBERSECURITY

(71) Applicant: Wiz, Inc., New York, NY (US)

(72) Inventors: Shahar Rand, Haifa (IL); Eric Abramov, Holon (IL); Yaniv Shaked, Tel Aviv (IL); Elad Gabay, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/359,493

(22) Filed: Jul. 26, 2023

Related U.S. Application Data

(63) Continuation-in-part of application No. 18/146,074, filed on Dec. 23, 2022, and a continuation-in-part of application No. 18/146,076, filed on Dec. 23, 2022.

(60) Provisional application No. 63/266,031, filed on Dec. 27, 2021.

(51) Int. Cl.
    *H04L 29/06* (2006.01)
    *H04L 9/08* (2006.01)
    *H04L 9/40* (2022.01)

(52) U.S. Cl.
    CPC ........ *H04L 9/0861* (2013.01); *H04L 63/1416* (2013.01)

(58) Field of Classification Search
    None
    See application file for complete search history.

(56) References Cited

U.S. PATENT DOCUMENTS

| | | |
|---|---|---|
| 6,910,132 B1 | 6/2005 | Bhattacharya |
| 7,627,652 B1 | 12/2009 | Commons et al. |
| 7,784,101 B2 | 8/2010 | Verbowski et al. |

(Continued)

FOREIGN PATENT DOCUMENTS

| | | |
|---|---|---|
| EP | 4160983 A1 | 4/2023 |
| EP | 4254869 A2 | 10/2023 |
| RU | 2421792 C2 | 6/2011 |

OTHER PUBLICATIONS

Guo, yu et al. Enabling Encrypted Rich Queries in Distributed Key-Value Stores. IEEE Transactions on Parallel and Distributed Systems, vol. 30, Issue: 6. https://ieeexplore.ieee.org/stamp/stamp.jsp?tp=&arnumber=8567979 (Year: 2019).*

(Continued)

*Primary Examiner* — Jeremiah L Avery
(74) *Attorney, Agent, or Firm* — M&B IP Analysts, LLC

(57) ABSTRACT

A system and method reduces use of restricted operations in a cloud computing environment during cybersecurity threat inspection. The method includes: detecting an encrypted disk in a cloud computing environment, the encrypted disk encrypted utilizing a first key in a key management system (KMS); generating a second key in the KMS, the second key providing access for a principal of an inspection environment; generating a snapshot of the encrypted disk; generating a volume based on the snapshot, wherein the volume is re-encrypted with the second key; generating a snapshot of the re-encrypted volume; generating an inspectable disk from the snapshot of the re-encrypted volume; and initiating inspection for a cybersecurity object on the inspectable disk.

17 Claims, 6 Drawing Sheets

(56) References Cited

U.S. PATENT DOCUMENTS

| | | |
|---|---|---|
| 8,200,965 B2 | 6/2012 | Fujibayashi et al. |
| 8,413,239 B2 | 4/2013 | Sutton |
| 8,499,354 B1 | 7/2013 | Satish et al. |
| 8,595,822 B2 | 11/2013 | Schrecker et al. |
| 8,701,200 B2 | 4/2014 | Naldurg et al. |
| 8,789,049 B2 | 7/2014 | Hutchins et al. |
| 8,898,481 B1 | 11/2014 | Osburn, III et al. |
| 8,914,406 B1 | 12/2014 | Haugsnes |
| 9,009,836 B1 | 4/2015 | Yarykin et al. |
| 9,119,017 B2 | 8/2015 | Sinha |
| 9,165,142 B1 | 10/2015 | Sanders et al. |
| 9,172,621 B1 | 10/2015 | Dippenaar |
| 9,330,273 B2 | 5/2016 | Khetawat et al. |
| 9,369,433 B1 | 6/2016 | Paul |
| 9,419,996 B2 | 8/2016 | Porat |
| 9,438,634 B1 | 9/2016 | Ross et al. |
| 9,467,473 B2 | 10/2016 | Jayaraman |
| 9,544,327 B1 | 1/2017 | Sharma et al. |
| 9,563,385 B1 | 2/2017 | Kowalski et al. |
| 9,569,328 B2 | 2/2017 | Pavlov et al. |
| 9,582,662 B1 | 2/2017 | Messick et al. |
| 9,607,104 B1 | 3/2017 | Turner et al. |
| 9,646,172 B1 | 5/2017 | Hahn |
| 9,661,009 B1 | 5/2017 | Karandikar et al. |
| 9,672,355 B2 | 6/2017 | Titonis et al. |
| 9,712,503 B1 | 7/2017 | Ahmed |
| 9,892,261 B2 | 2/2018 | Joram et al. |
| 10,002,247 B2 | 6/2018 | Suarez et al. |
| 10,032,032 B2 | 7/2018 | Suarez et al. |
| 10,063,445 B1 | 8/2018 | Preece |
| 10,135,826 B2 | 11/2018 | Reddy |
| 10,229,125 B2 | 3/2019 | Goodman et al. |
| 10,255,370 B2 | 4/2019 | Carpenter et al. |
| 10,360,025 B2 | 7/2019 | Foskett et al. |
| 10,412,103 B2 | 9/2019 | Haugsnes |
| 10,412,109 B2 | 9/2019 | Loureiro et al. |
| 10,503,904 B1 | 12/2019 | Singh et al. |
| 10,540,499 B2 | 1/2020 | Wailly et al. |
| 10,554,507 B1 | 2/2020 | Siddiqui et al. |
| 10,567,468 B2 | 2/2020 | Perlmutter |
| 10,572,226 B2 | 2/2020 | Biskup et al. |
| 10,574,675 B2 | 2/2020 | Peppe et al. |
| 10,623,386 B1 * | 4/2020 | Bernat ............... H04L 63/061 |
| 10,630,642 B2 | 4/2020 | Clark et al. |
| 10,664,619 B1 | 5/2020 | Marelas |
| 10,691,636 B2 | 6/2020 | Tabaaloute et al. |
| 10,725,775 B2 | 7/2020 | Suarez et al. |
| 10,735,442 B1 | 8/2020 | Swackhamer |
| 10,791,138 B1 | 9/2020 | Siddiqui et al. |
| 10,803,188 B1 | 10/2020 | Rajput et al. |
| 10,831,898 B1 | 11/2020 | Wagner |
| 10,915,626 B2 | 2/2021 | Tang |
| 10,924,503 B1 | 2/2021 | Pereira et al. |
| 10,972,484 B1 | 4/2021 | Swackhamer |
| 10,997,293 B2 | 5/2021 | Wiest et al. |
| 11,005,860 B1 | 5/2021 | Glyer et al. |
| 11,044,118 B1 * | 6/2021 | Reed ................... H04L 12/66 |
| 11,099,976 B2 | 8/2021 | Khakare et al. |
| 11,165,652 B1 | 11/2021 | Byrne |
| 11,216,563 B1 | 1/2022 | Veselov et al. |
| 11,245,730 B2 | 2/2022 | Bailey |
| 11,271,961 B1 | 3/2022 | Berger |
| 11,334,670 B2 | 5/2022 | Franco et al. |
| 11,366,897 B1 * | 6/2022 | Ramanathan ......... H04L 9/3263 |
| 11,388,183 B2 | 7/2022 | Hoopes et al. |
| 11,444,974 B1 | 9/2022 | Shakhzadyan |
| 11,483,317 B1 | 10/2022 | Bolignano et al. |
| 11,496,498 B2 | 11/2022 | Wright et al. |
| 11,496,519 B1 * | 11/2022 | Gupta ................. H04L 9/0891 |
| 11,503,063 B2 | 11/2022 | Rao |
| 11,507,672 B1 | 11/2022 | Pagnozzi et al. |
| 11,516,222 B1 | 11/2022 | Srinivasan et al. |
| 11,520,907 B1 * | 12/2022 | Borowiec ............... G06F 3/067 |
| 11,546,360 B2 | 1/2023 | Woodford et al. |
| 11,556,659 B1 * | 1/2023 | Kumar ................. G06F 21/602 |
| 11,558,401 B1 | 1/2023 | Vashisht et al. |
| 11,558,423 B2 | 1/2023 | Gordon et al. |
| 11,567,751 B2 | 1/2023 | Cosentino et al. |
| 11,570,090 B2 | 1/2023 | Shen et al. |
| 11,614,956 B2 * | 3/2023 | Tsirkin ................. G06F 21/602 |
| | | 713/193 |
| 11,645,390 B2 | 5/2023 | Vijayvargiya et al. |
| 11,662,928 B1 * | 5/2023 | Kumar ................ G06F 11/1458 |
| | | 713/150 |
| 11,669,386 B1 | 6/2023 | Abrol |
| 11,750,566 B1 * | 9/2023 | Montilla Lugo ..... H04L 63/168 |
| | | 713/153 |
| 11,757,844 B2 | 9/2023 | Xiao |
| 11,770,398 B1 | 9/2023 | Erlingsson |
| 11,792,284 B1 | 10/2023 | Nanduri |
| 11,799,874 B1 | 10/2023 | Lichtenstein et al. |
| 11,803,766 B1 | 10/2023 | Srinivasan |
| 11,841,945 B1 | 12/2023 | Fogel |
| 11,914,707 B1 * | 2/2024 | Ramanathan ......... H04L 9/0861 |
| 11,922,220 B2 | 3/2024 | Haghighat et al. |
| 11,936,785 B1 | 3/2024 | Shemesh et al. |
| 2005/0283645 A1 | 12/2005 | Turner et al. |
| 2007/0174915 A1 | 7/2007 | Gribble et al. |
| 2008/0075283 A1 | 3/2008 | Takahashi |
| 2008/0221833 A1 | 9/2008 | Brown et al. |
| 2008/0320594 A1 | 12/2008 | Jiang |
| 2010/0281275 A1 | 11/2010 | Lee et al. |
| 2012/0110651 A1 | 5/2012 | Van Biljon et al. |
| 2013/0124669 A1 | 5/2013 | Anderson et al. |
| 2013/0160119 A1 | 6/2013 | Sartin |
| 2013/0160129 A1 | 6/2013 | Sartin |
| 2014/0096134 A1 | 4/2014 | Barak |
| 2014/0237537 A1 | 8/2014 | Manmohan |
| 2014/0317677 A1 | 10/2014 | Vaidya |
| 2014/0337613 A1 | 11/2014 | Martini |
| 2015/0033305 A1 | 1/2015 | Shear |
| 2015/0055647 A1 | 2/2015 | Roberts |
| 2015/0163192 A1 | 6/2015 | Jain |
| 2015/0172321 A1 | 6/2015 | Kirti et al. |
| 2015/0254364 A1 | 9/2015 | Piduri et al. |
| 2015/0304302 A1 | 10/2015 | Zhang et al. |
| 2016/0063466 A1 | 3/2016 | Sheridan et al. |
| 2016/0105454 A1 | 4/2016 | Li |
| 2016/0140352 A1 | 5/2016 | Nickolov |
| 2016/0156664 A1 | 6/2016 | Nagaratnam |
| 2016/0224600 A1 | 8/2016 | Munk |
| 2016/0366185 A1 | 12/2016 | Lee et al. |
| 2017/0026416 A1 | 1/2017 | Carpenter et al. |
| 2017/0034198 A1 | 2/2017 | Powers et al. |
| 2017/0070506 A1 | 3/2017 | Reddy |
| 2017/0104755 A1 | 4/2017 | Arregoces |
| 2017/0185784 A1 | 6/2017 | Madou |
| 2017/0187743 A1 | 6/2017 | Madou |
| 2017/0223024 A1 | 8/2017 | Desai |
| 2017/0237560 A1 | 8/2017 | Mueller et al. |
| 2017/0257347 A1 | 9/2017 | Yan |
| 2018/0004950 A1 | 1/2018 | Gupta et al. |
| 2018/0007087 A1 | 1/2018 | Grady et al. |
| 2018/0026995 A1 | 1/2018 | Dufour et al. |
| 2018/0027009 A1 | 1/2018 | Santos |
| 2018/0063290 A1 | 3/2018 | Yang et al. |
| 2018/0159882 A1 | 6/2018 | Brill |
| 2018/0181310 A1 | 6/2018 | Feinberg et al. |
| 2018/0234459 A1 | 8/2018 | Kung |
| 2018/0239902 A1 | 8/2018 | Godard |
| 2018/0270268 A1 | 9/2018 | Gorodissky et al. |
| 2018/0276084 A1 | 9/2018 | Mitkar et al. |
| 2018/0278639 A1 | 9/2018 | Bernstein et al. |
| 2018/0288129 A1 | 10/2018 | Joshi et al. |
| 2018/0309747 A1 | 10/2018 | Sweet et al. |
| 2018/0321993 A1 | 11/2018 | McClory |
| 2018/0359058 A1 | 12/2018 | Kurian |
| 2018/0359059 A1 | 12/2018 | Kurian |
| 2019/0058722 A1 | 2/2019 | Levin et al. |
| 2019/0068617 A1 | 2/2019 | Coleman |
| 2019/0068627 A1 | 2/2019 | Thampy |
| 2019/0104140 A1 | 4/2019 | Gordeychik et al. |
| 2019/0116111 A1 | 4/2019 | Izard et al. |
| 2019/0121986 A1 | 4/2019 | Stopel et al. |

(56) References Cited

U.S. PATENT DOCUMENTS

| | | |
|---|---|---|
| 2019/0132350 A1 | 5/2019 | Smith et al. |
| 2019/0149604 A1 | 5/2019 | Jahr |
| 2019/0171811 A1 | 6/2019 | Daniel et al. |
| 2019/0191417 A1 | 6/2019 | Baldemair et al. |
| 2019/0207966 A1 | 7/2019 | Vashisht et al. |
| 2019/0220575 A1 | 7/2019 | Boudreau et al. |
| 2019/0245883 A1 | 8/2019 | Gorodissky et al. |
| 2019/0260764 A1 | 8/2019 | Humphrey et al. |
| 2020/0028862 A1 | 1/2020 | Lin |
| 2020/0050440 A1 | 2/2020 | Chuppala et al. |
| 2020/0082094 A1 | 3/2020 | McAllister et al. |
| 2020/0125352 A1 | 4/2020 | Kannan |
| 2020/0244678 A1 | 7/2020 | Shua |
| 2020/0259852 A1 | 8/2020 | Wolff et al. |
| 2020/0287927 A1 | 9/2020 | Zadeh et al. |
| 2020/0320845 A1 | 10/2020 | Livny et al. |
| 2020/0336489 A1 | 10/2020 | Wuest et al. |
| 2020/0387357 A1 | 12/2020 | Mathon et al. |
| 2020/0389469 A1 | 12/2020 | Litichever et al. |
| 2021/0026932 A1 | 1/2021 | Boudreau et al. |
| 2021/0089662 A1* | 3/2021 | Muniswamy-Reddy ............... H04L 63/166 |
| 2021/0105304 A1 | 4/2021 | Kraning et al. |
| 2021/0149788 A1 | 5/2021 | Downie |
| 2021/0158835 A1 | 5/2021 | Hill et al. |
| 2021/0176123 A1 | 6/2021 | Plamondon |
| 2021/0200881 A1 | 7/2021 | Joshi et al. |
| 2021/0203684 A1 | 7/2021 | Maor et al. |
| 2021/0211453 A1 | 7/2021 | Cooney |
| 2021/0216630 A1* | 7/2021 | Karr ............... H04L 63/1416 |
| 2021/0226812 A1 | 7/2021 | Park |
| 2021/0234889 A1 | 7/2021 | Burle et al. |
| 2021/0263802 A1 | 8/2021 | Gottemukkula et al. |
| 2021/0314342 A1 | 10/2021 | Oberg |
| 2021/0320794 A1* | 10/2021 | Auh ............... H04L 9/0894 |
| 2021/0334386 A1 | 10/2021 | AlGhamdi et al. |
| 2021/0357246 A1 | 11/2021 | Kumar et al. |
| 2021/0368045 A1 | 11/2021 | Verma |
| 2021/0382995 A1* | 12/2021 | Massiglia ............... G06F 21/78 |
| 2021/0382997 A1 | 12/2021 | Yi et al. |
| 2021/0409486 A1 | 12/2021 | Martinez |
| 2022/0012771 A1 | 1/2022 | Gustafson |
| 2022/0086173 A1 | 3/2022 | Yavo et al. |
| 2022/0131888 A1 | 4/2022 | Kanso |
| 2022/0156396 A1* | 5/2022 | Bednash ............... G06F 21/554 |
| 2022/0179964 A1 | 6/2022 | Qiao et al. |
| 2022/0182403 A1 | 6/2022 | Mistry |
| 2022/0188273 A1 | 6/2022 | Koorapati et al. |
| 2022/0197926 A1 | 6/2022 | Passey et al. |
| 2022/0215101 A1 | 7/2022 | Rioux et al. |
| 2022/0232024 A1 | 7/2022 | Kapoor |
| 2022/0263656 A1* | 8/2022 | Moore ............... H04L 9/0833 |
| 2022/0284362 A1 | 9/2022 | Bellinger et al. |
| 2022/0309166 A1 | 9/2022 | Shenoy et al. |
| 2022/0326861 A1* | 10/2022 | Shachar ............... G06F 21/606 |
| 2022/0327119 A1 | 10/2022 | Gasper et al. |
| 2022/0342690 A1 | 10/2022 | Shua |
| 2022/0342997 A1 | 10/2022 | Watanabe et al. |
| 2022/0345481 A1 | 10/2022 | Shua |
| 2022/0350931 A1 | 11/2022 | Shua |
| 2022/0357992 A1 | 11/2022 | Karpovsky |
| 2022/0400128 A1 | 12/2022 | Kfir et al. |
| 2022/0407841 A1 | 12/2022 | Karpowicz |
| 2022/0407889 A1 | 12/2022 | Narigapalli et al. |
| 2022/0413879 A1 | 12/2022 | Passey et al. |
| 2022/0414103 A1 | 12/2022 | Upadhyay et al. |
| 2022/0417011 A1 | 12/2022 | Shua |
| 2022/0417219 A1 | 12/2022 | Sheriff |
| 2023/0007014 A1 | 1/2023 | Narayan |
| 2023/0040635 A1 | 2/2023 | Narayan |
| 2023/0075355 A1 | 3/2023 | Twigg |
| 2023/0087093 A1 | 3/2023 | Ithal et al. |
| 2023/0110080 A1 | 4/2023 | Hen |
| 2023/0123477 A1 | 4/2023 | Luttwak et al. |
| 2023/0125134 A1 | 4/2023 | Raleigh et al. |
| 2023/0134674 A1 | 5/2023 | Quinn et al. |
| 2023/0136839 A1 | 5/2023 | Sundararajan et al. |
| 2023/0164148 A1 | 5/2023 | Narayan |
| 2023/0192418 A1 | 6/2023 | Horowitz et al. |
| 2023/0208870 A1 | 6/2023 | Yellapragada et al. |
| 2023/0231867 A1 | 7/2023 | Rampura Venkatachar |
| 2023/0237068 A1 | 7/2023 | Sillifant et al. |
| 2023/0254330 A1 | 8/2023 | Singh |
| 2023/0297666 A1 | 9/2023 | Atamli et al. |
| 2023/0325814 A1* | 10/2023 | Vijayan ............... G06Q 20/3829 705/66 |
| 2023/0336578 A1 | 10/2023 | Lidgi et al. |
| 2023/0376586 A1 | 11/2023 | Shemesh et al. |
| 2024/0007492 A1 | 1/2024 | Shen et al. |
| 2024/0037229 A1 | 2/2024 | Pabón et al. |
| 2024/0045838 A1 | 2/2024 | Reiss et al. |
| 2024/0080329 A1 | 3/2024 | Reed et al. |
| 2024/0080332 A1 | 3/2024 | Ganesh et al. |

OTHER PUBLICATIONS

Mishra, Bharati; Jena, Debasish et al. Securing Files in the Cloud. 2016 IEEE International Conference on Cloud Computing in Emerging Markets (CCEM). https://ieeexplore.ieee.org/stamp/stamp.jsp?tp=&arnumber=7819669 (Year: 2016).*

Kumar, Anuj et al. A New Approach for Security in Cloud Data Storage for IoT Applications Using Hybrid Cryptography Technique. 2020 International Conference on Power Electronics & IoT Applications in Renewable Energy and its Control. https://ieeexplore.ieee.org/stamp/stamp.jsp?tp=&arnumber=9087010 (Year: 2020).*

Shuvo, Arfatul Mowla et al. Storage Efficient Data Security Model for Distributed Cloud Storage. 2020 IEEE 8th R10 Humanitarian Technology Conference (R10-HTC). https://ieeexplore.ieee.org/stamp/stamp.jsp?tp=&arnumber=9356962 (Year: 2020).*

Ali Gholami; Security and Privacy of Sensitive Data in Cloud Computing: A Survey of Recent Developments; ARIX:2016; pp. 131-150.

Christos Kyrkou; Towards artificial-intelligence-based cybersecurity for robustifying automated driving systems against camera sensor attacks; IEEE 2020; pp. 476-481.

Henry Hanping Feng; Anomaly Detection Using Call Stack Information; IEEE: Year:2003; pp. 1-14.

International Search Report for PCT Application No. PCT/IB2022/060940 dated Feb. 1, 2023. The International Bureau of WIPO.

International Search Report for PCT/IB2023/050848, dated May 9, 2023. International Bureau of WIPO.

International Search Report of PCT/IB2023/058074, dated Nov. 20, 2023. Searching Authority United States Patent and Trademark Office, Alexandria, Virginia.

International Search Report, PCT/IB23/55312. ISA/US, Commissioner for Patents, Alexandria, Virginia. Dated Aug. 30, 2023.

Microsoft Build. "Introduction to Azure managed disks". Aug. 21, 2023, https://docs.microsoft.com/en-us/azure/virtual-machines/managed-disks-overview.

Microsoft Docs. "Create a VM from a managed image". Article. Jan. 5, 2022. https://docs.microsoft.com/en-US/azure/virtual-machines/windows/create-vm-generalized-managed.

Written Opinion of the International Searching Authority for PCT Application No. PCT/IB2022/060940 dated Feb. 1, 2023. The International Bureau of WIPO.

Written Opinion of the International Searching Authority, PCT/IB23/55312. ISA/US Commissioner for Patents, Alexandria, Virginia. Dated Aug. 30, 2023.

Written Opinion of the Searching Authority for PCT/IB2023/050848, dated May 9, 2023. International Bureau of WIPO.

Written Opinion of the Searching Authority of PCT/IB2023/058074, dated Nov. 20, 2023. Searching Authority United States Patent and Trademark Office, Alexandria, Virginia.

Zhang et al. BMC Bioinformatics 2014. "On finding bicliques in bipartite graphs: a novel algorithm and its application to the integration of diverse biological data types". http://www.biomedcentral.com/1471-2105/15/110.

(56) References Cited

OTHER PUBLICATIONS

Sahil Suneja; Safe Inspection of Live Virtual Machines; IEEE; Year:2017; pp. 97-111.

* cited by examiner

TECHNIQUES FOR CIRCUMVENTING PROVIDER-IMPOSED LIMITATIONS IN SNAPSHOT INSPECTION OF DISKS FOR CYBERSECURITY

CROSS-REFERENCE TO RELATED APPLICATIONS

This application is a continuation-in-part of U.S. patent application Ser. No. 18/146,074 filed on Dec. 23, 2022, and a continuation-in-part of U.S. patent application Ser. No. 18/146,076 filed on Dec. 23, 2022, both of which claim the benefit of U.S. Provisional Patent Application No. 63/266,031 filed on Dec. 27, 2021. All contents of the preceding applications are hereby incorporated by reference.

TECHNICAL FIELD

The present disclosure relates generally to cybersecurity threat detection, and specifically to inspection of encrypted disks during threat detection.

BACKGROUND

Cybersecurity threats are ever present in cloud computing environments, and often leave traces, indicators, and the like, on a disk, storage space, memory, etc., of the workload with which they are associated. For example, a cybersecurity threat can be a misconfiguration, a vulnerability, an exposure, a weak secret, an exposed password, an out of date software application, and the like.

Scanning for cybersecurity threats in a cloud computing environment often includes scanning storage, disks, and the like, for such cybersecurity objects. One method of protecting information includes encrypting storage resources, such as disks, so that even if they are accessed by an unauthorized party, the disk is not readable. However, such encrypted disks also cannot be scanned as a scanner requires an unencrypted volume to access. Encrypted disks present a challenge as decryption keys may not be readily available, and therefore their contents cannot be scanned.

Encryption of disks can be performed at application level, on a cloud platform level, or both. A scanner therefore cannot readily access the information on the disk, or determine what it present on it.

Further complicating matters, certain actions utilized by cloud computing infrastructures, such as Amazon® Web Services (AWS) are restricted, for example to a certain number of operations for a given time frame. Such actions which are utilized in the process of detecting cybersecurity threats pose a severe bottleneck.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include detecting an encrypted disk in a cloud computing environment, the encrypted disk encrypted utilizing a first key in a key management system (KMS). Method may also include generating a second key in the KMS, the second key providing access for a principal of an inspection environment. Method may furthermore include generating a snapshot of the encrypted disk. Method may in addition include generating a volume based on the snapshot, where the volume is re-encrypted with the second key. Method may moreover include generating a snapshot of the re-encrypted volume. Method may also include generating an inspectable disk from the snapshot of the re-encrypted volume. Method may furthermore include initiating inspection for a cybersecurity object on the inspectable disk. Other embodiments of this aspect include corresponding computer systems, apparatus, and computer programs recorded on one or more computer storage devices, each configured to perform the actions of the methods.

Implementations may include one or more of the following features. Method may include: determining that the encrypted disk is encrypted based on metadata associated with the encrypted disk. Method may include: associating the second key with a principal of an inspection environment. Method may include: inspecting the inspectable disk for any one of: a file, a text, a regular expression (regex), a secret, a key, a certificate, a virtual workload, and any combination thereof. Method may include: generating the second key utilizing any instruction of: kms:CreateGrant, kms:CreatKey, kms:PutKeyPolicy, and any combination thereof. Method may include: generating volume utilizing any instruction of: kms:ReEncryptFrom, kms:ReEncryptTo, and any combination thereof. Method may include: generating a decrypted inspectable disk, based on the second key. In an embodiment, the generated snapshot is encrypted with the first key. Implementations of the described techniques may include hardware, a method or process, or a computer tangible medium.

In one general aspect, non-transitory computer-readable medium may include one or more instructions that, when executed by one or more processors of a device, cause the device to: detect an encrypted disk in a cloud computing environment, the encrypted disk encrypted utilizing a first key in a key management system (KMS). Medium may furthermore generate a second key in the KMS, the second key providing access for a principal of an inspection environment. Medium may in addition generate a snapshot of the encrypted disk. Medium may moreover generate a volume based on the snapshot, where the volume is re-encrypted with the second key. Medium may also generate a snapshot of the re-encrypted volume. Medium may furthermore generate an inspectable disk from the snapshot of the re-encrypted volume. Medium may in addition initiate inspection for a cybersecurity object on the inspectable disk. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: detect an encrypted disk in a cloud computing environment, the encrypted disk encrypted utilizing a first key in a key management system (KMS). System may in addition generate a second key in the KMS, the second key providing access for a principal of an inspection environment. System may moreover generate a snapshot of the encrypted disk. System may also generate a volume based on the snapshot, where the volume is re-encrypted with the second key. System may furthermore generate a snapshot of the re-encrypted volume. System may in addition generate an inspectable disk from the snapshot of the re-encrypted volume. System may moreover initiate inspection for a cybersecurity object on the inspectable disk. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: determine that the encrypted disk is encrypted based on metadata associated with the encrypted disk. System where the memory contains further instructions which when executed by the processing circuitry further configure the system to: associate the second key with a principal of an inspection environment. System where the memory contains further instructions which when executed by the processing circuitry further configure the system to: inspect the inspectable disk for any one of: a file, a text, a regular expression (regex), a secret, a key, a certificate, a virtual workload, and any combination thereof. System where the memory contains further instructions which when executed by the processing circuitry further configure the system to: generate the second key utilizing any instruction of: kms:CreateGrant, kms:CreatKey, kms:PutKeyPolicy, and any combination thereof. System where the memory contains further instructions which when executed by the processing circuitry further configure the system to: generate the volume utilizing any instruction of: kms:ReEncryptFrom, kms:ReEncryptTo, and any combination thereof. System where the memory contains further instructions which when executed by the processing circuitry further configure the system to: generate a decrypted inspectable disk, based on the second key. System where the generated snapshot is encrypted with the first key. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
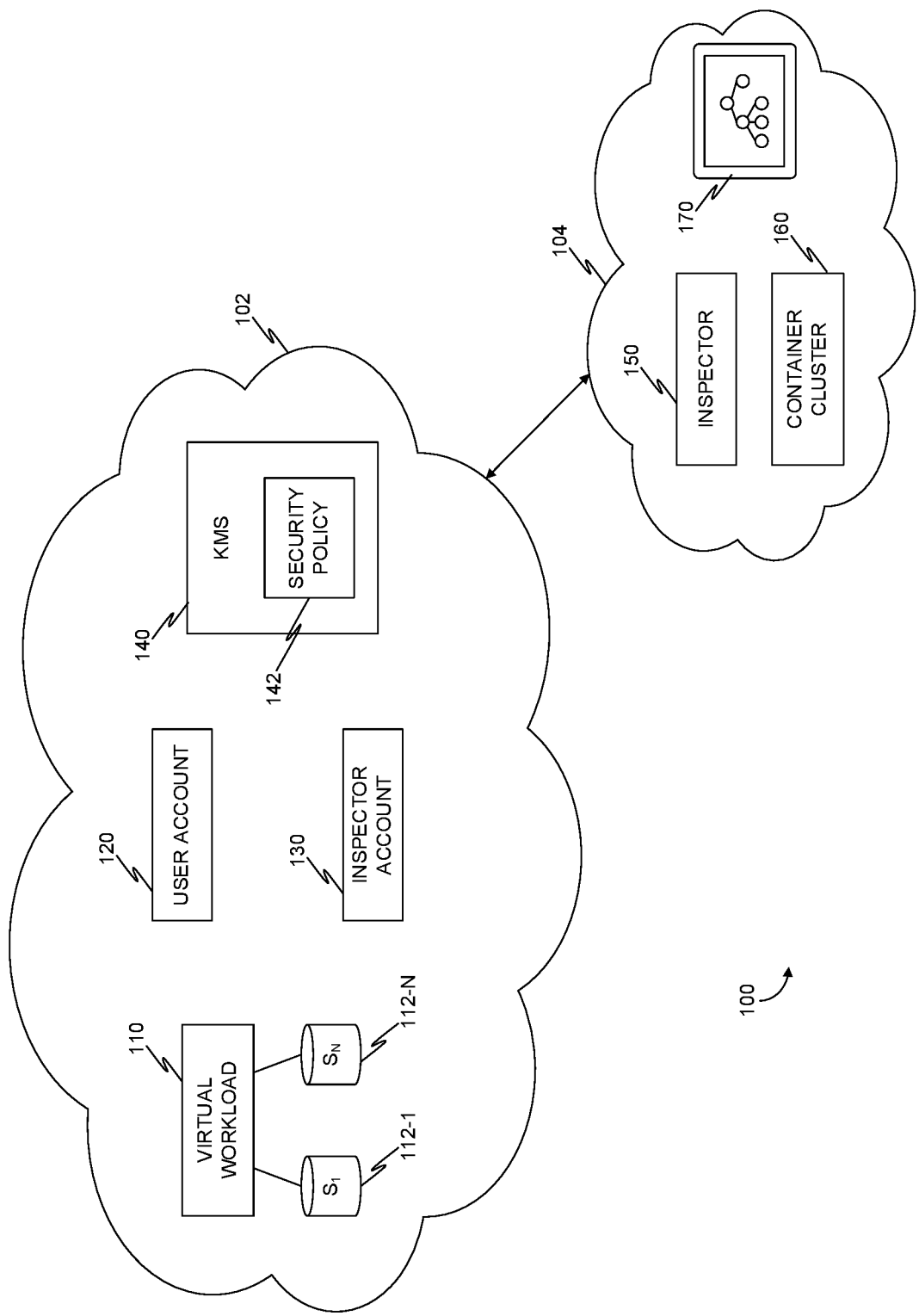
FIG. 1 is a schematic illustration of a network diagram of a production cloud environment and an inspecting cloud environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for reducing use of snapshot copy operations in cybersecurity inspection, is disclosed. In some embodiments, operations such as CopySnapshot in an Amazon® Web Services (AWS) environment are limited, restricted, and the like, for example, to a certain number of operations in a given time frame, to a given number of concurrent operations of a first type, a combination thereof, and the like. It is therefore advantageous to provide an alternate method to reduce use of limited operations, as these are a bottleneck for inspecting workloads in a computing environment.

FIG. 1 is an example schematic illustration of a network diagram 100 of a production cloud environment and an inspecting cloud environment, utilized to describe an embodiment. In an embodiment, a production cloud environment 102 includes a plurality of principals, such as user account 120, and a plurality of virtual resources, such as virtual workload 110. In some embodiments, a cloud environment is implemented utilizing a cloud computing infrastructure, such as Amazon® Web Services (AWS), Microsoft® Azure, or Google® Cloud Platform (GCP). Storage may be implemented, for example using S3 in AWS.

In an embodiment, a virtual resource is a cloud entity which provides a service, access to a service, provisioning of hardware, and the like, such as a virtual machine, a software container, a serverless function, and the like. In certain embodiments, a principal is a cloud entity which is authorized to act on a resource. For example, according to an embodiment, a principal is a user account, a service account, a role, a combination thereof, and the like.

In some embodiments, the virtual workload 110 is connected a storage disk, a plurality of storage disks, and the like, such as storage disks 112-1 through 112-N, where 'N' is an integer having a value of '2' or greater. In some embodiments, the storage disk is provisioned as a virtual disk, as a block address on a block storage, and the like. For example, a block storage is a Simple Storage Service (S3®), according to an embodiment.

In an embodiment, a user account 120 includes unique identifiers, such as email address, username, password, combinations thereof, and the like. A user account is managed by an identity and access management (IAM) service in a cloud environment, according to an embodiment. The IAM service further controls (i.e., defines authorizations, policies, rules, and the like, for) user groups, user roles, permissions, service accounts, and the like, in some embodiments.

In some embodiments an inspector account 130 is deployed in the production environment 102, and is implemented, for example as a user account, a service account, and the like. The inspector account is authorized to communicate with various components of the cloud environment 102 and further communicate with an inspecting cloud environment 104, according to some embodiments.

In certain embodiments, the inspector account 130 is configured to communicate with a key management service (KMS) 140. The KMS 140 is implemented as a virtual workload, a plurality of virtual workloads, and the like, in the production cloud environment 102, according to an embodiment. In some embodiments the KMS 140 is deployed on the cloud computing infrastructure on which the production environment 102 is deployed.

A KMS 140 is configured to store therein keys which are used to access encrypted resources in the production cloud environment 102, such as encrypted disks, encrypted files, and the like, according to an embodiment. The KMS 140 further includes a security policy engine 142, which is configured to associate a security policy with at least a portion of the keys stored in the KMS 140, according to an embodiment. In certain embodiments, a security policy indicates what user accounts are authorized to use a key managed by the KMS 140.

In an embodiment, the inspecting cloud environment 104 is configured to receive information from the production cloud environment 102 and is further configured to detect cybersecurity risks in the production cloud environment 102. In some embodiments, the inspecting cloud environment 104 includes a plurality of inspectors, such as inspector 150, which are each configured to detect a cybersecurity object. A cybersecurity object is, according to an embodiment, a secret, an application, a key, a certificate, a malware, a password, a combination thereof, and the like.

In certain embodiments, the inspector 150 is implemented as a virtual workload, such as a serverless function, deployed in the inspecting cloud environment 104. An inspector 150 is configured to receive information originating from the cloud production environment 102, in some embodiments, and is further configured to inspect the information to discover predefined data objects (i.e., cybersecurity objects) therein.

In an embodiment, the inspecting cloud environment 104 further includes a software container cluster, such as software container cluster 160. The software container cluster 160 is implemented for example utilizing a Kubernetes® (stylized as K8s) application, according to an embodiment. In certain embodiments, each cluster 160 includes a plurality of nodes.

For example, in an embodiment, an inspectable disk is generated based on the disk 112-1 in order to inspect the contents of the disk 112-1. In an embodiment, the inspectable disk is generated based on a snapshot, a clone, a copy, a combination thereof, and the like, of the disk 112-1. In certain embodiments, access to the inspectable disk is provided to the inspector 150 via the inspector account 130. For example, the inspector 150 is configured, in an embodiment, to utilize a service account (e.g., the inspector account 130) to access the inspectable disk and perform operations thereon, such as a read operation to access the contents of the inspectable disk.

In an embodiment, the software container cluster 160 is configured to provision a storage resource attached to a container, for example as a volume which is generated based on the inspectable disk. In certain embodiments, an inspector 150 is configured to access to the volume, and inspect the volume for a cybersecurity object. In an embodiment a plurality of inspectors are configured to each access the volume generated from the inspectable disk. Inspecting the inspectable disk in place of the disk 112-1 in the production environment allows the production environment to continue its operation with minimal interference, while inspecting the contents of the disk 112-1 without disrupting operation in the production environment.

Figure 2:
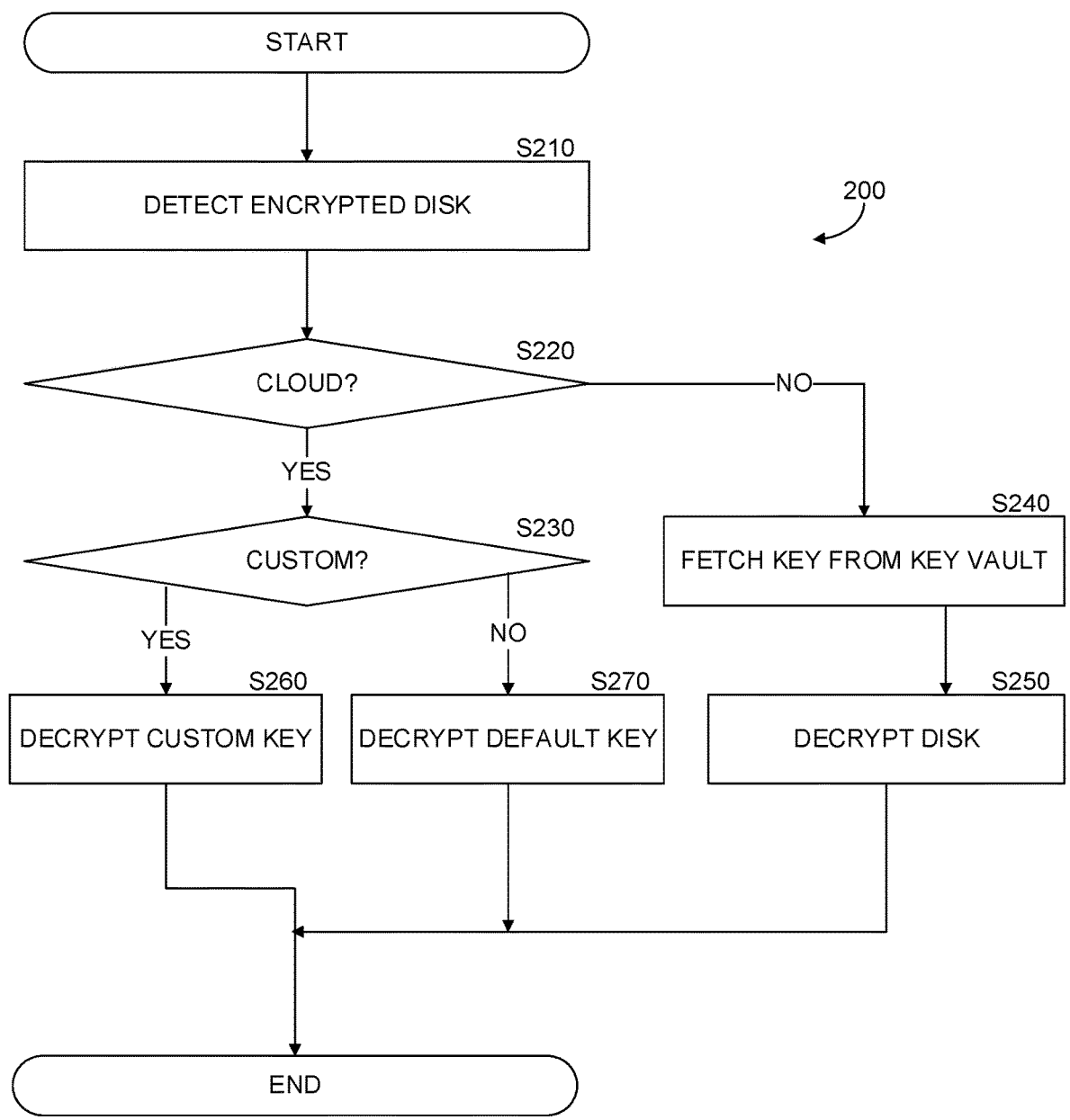
FIG. 2 is a flowchart of a method for inspecting encrypted disks of workloads in a cloud environment, implemented according to an embodiment.

FIG. 2 is an example flowchart 200 of a method for inspecting encrypted disks of workloads in a cloud environment, implemented according to an embodiment. In some embodiments, generating an inspectable disk based on a snapshot of an encrypted disk will result in a snapshot which is not readable without a corresponding key.

It is beneficial for the inspecting cloud environment to be able to inspect such encrypted disks. In an embodiment, encryption of the disk is provided at the cloud level, application level, a combination thereof, and the like.

While some embodiments illustrate user of cloud managed encryption in AWS, and application level encryption in Azure, it should be readily apparent that the teachings herein can be applied to other cloud infrastructures with appropriate adjustments.

At S210, an encrypted disk is selected for inspection. In an embodiment, the encrypted disk is associated with a virtual workload, for example by provisioning a storage resource to the virtual workload. In an embodiment, a virtual workload is, for example, a virtual machine, a serverless function, a software container, and the like. In an embodiment, an inspection account (i.e., a service account) is utilized in determining that a disk is encrypted in a production cloud environment.

For example, in an embodiment a service account is authorized to access a disk, access metadata of a storage disk, access a storage provisioning system, and the like, to determine if a disk is an encrypted disk. In an embodiment, an encrypted disk includes metadata which indicates that the disk is an encrypted disk.

At S220, a check is performed to determine a level of encryption. In an embodiment, a disk is encrypted at application level, encrypted at cloud level, a combination thereof, and the like. In an embodiment, cloud level encryption (also referred to as cloud managed encryption) includes utilizing a key of a Key Management System (KMS) to encrypt a disk. In an embodiment, if the disk is encrypted at the application level execution continues at S230.

In some embodiments, if the disk is encrypted using cloud managed encryption execution continues at S240. In an embodiment, a disk may be encrypted utilizing one or more methods of cloud managed encryption and application level encryption. The methods for accessing such disks may be used consecutively, until a fully decrypted disk is accessible.

At S230, a check is performed to determine a key type. In an embodiment, a key type is a default key, a custom key, and the like. For example, a KMS in AWS supports two types of keys. The first type is an Elastic Block Store (EBS) default key, and the second type is a custom key. A policy associated with the default key cannot be changed, while for a custom key the policy can be configured, and reconfigured.

If the key is a custom key execution continues at S260, according to an embodiment. In an embodiment, if the key is a default key, execution continues at S270.

At S240, a key is fetched from the key vault. For example, in an embodiment, Azure Key Vault is utilized as a KMS, implemented in Azure® cloud environments. At an application level encryption, a disk may be encrypted using Bitlocker (for Windows® operating systems), Cryptoluks (for Linux operating systems), and like, in some embodiments. An inspector account is authorized to fetch keys from a key vault, according to an embodiment. In certain embodiments, a key is a KEK (key encryption key), meaning that the key is encrypted using another asymmetric encryption, and this needs to be decrypted as well.

At S250, the disk is decrypted. In an embodiment the disk is decrypted using the key fetched from the key vault. In some embodiments, an inspectable disk is generated from the decrypted disk, and access thereto is provided to an inspecting cloud environment, where the inspectable disk is inspected for cybersecurity objects. In an embodiment, a disk is encrypted at application level utilizing based on the operating system, for example Microsoft® Windows, or Linux.

Linux disks utilize Cryptoluks, which, in an embodiment, contains two partitions, a first partition which is encrypted and a second partition which is plaintext. The plaintext partition is mounted in the inspecting cloud environment, according to an embodiment. In some embodiments, the plaintext partition includes a file named 'osluksheader' which appears in the 'luks' directory. In an embodiment, an inspector is configured to execute a decrypt command, for example:

sudo cryptsetup open/dev/<encrypted-device> <name>- -header=/<mountpoint>/luks/osluksheader When prompted for a password, the passphrase (i.e., key) is provided after decoding the base64 through the pipe connected to the stdin. The result is a readable disk which is mountable using the device mapper, for example:

mount/dev/mapper/<name><mount point>

In an embodiment the disk is mounted, for example on a volume which is provisioned in an inspection cluster. In certain embodiments, an inspector is configured to search the disk for data objects (e.g., cybersecurity objects) which are utilized to assess security risks and map the disk, its contents, the corresponding workload, a combination thereof, and the like, to a security graph.

Windows operating system utilizes the Bitlocker application, according to an embodiment. Decrypting a Bitlocker encrypted disk includes, in an embodiment, setting the decoded base64 key from the keyvaults on the disk <secret-file.dat>. Decryption includes, according to an embodiment, executing the following command:

do dislocker /dev/<encrypted-device>-f <secret-file.bek> - - /media/<unencrypted-device>

In an embodiment, initiating execution of the command is performed by the inspector account. A decrypted disk is mounted, according to an embodiment, by initiating execution of the following instruction:

mount/media/<unencrypted-device>/dislocker-file/<mount-point>

In an embodiment, the instruction is executed by a control plane of a software container cluster in an inspection environment. A mounted disk, for example on a volume which is provisioned in an inspection software container cluster, is inspected for cybersecurity objects. In some embodiments, the disk, its contents, any detected cybersecurity object, and a corresponding workload, are represented on a security graph.

At S260, the disk is decrypted using the custom key. In some embodiments, decryption utilizing a custom key is described in more detail with respect to FIG. 3.

At S270, the disk is decrypted using the default key. Decryption utilizing a default key is described in more detail with respect to FIG. 4.

Figure 3:
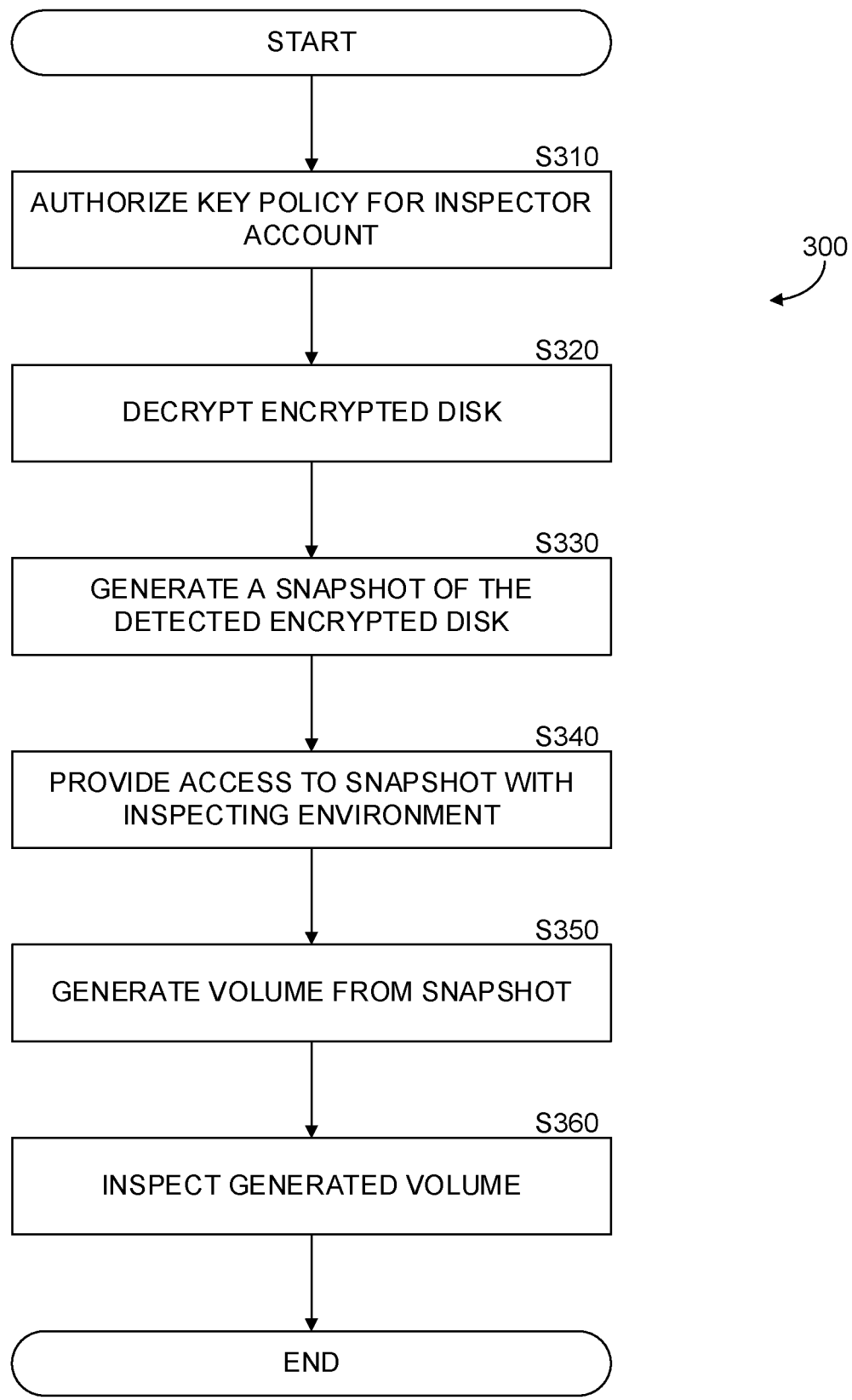
FIG. 3 is a flowchart of a method for disk decryption utilizing a custom key for security risk inspection, implemented in accordance with an embodiment.

FIG. 3 is an example of a flowchart 300 of a method for disk decryption utilizing a custom key for inspecting a disk for a cybersecurity object, implemented in accordance with an embodiment.

At S310, a key policy is attached to a custom key. The custom key is used for decrypting an encrypted disk in a cloud computing environment. In an embodiment, AWS KMS is used in an AWS cloud environment. A kms:PutKeyPolicy instruction is set to provide cross-account permissions, allowing an inspector account access to the required decryption keys, according to an embodiment.

In certain embodiments, the KMS is configured to provide certain instructions (such as DecribeKey, CreateGrant, GenerateDataKey, ReEncrypt, Decrypt, etc.) only to keys in the KMS which have a tag corresponding to permissions granted to the inspector account.

At S320, the encrypted disk is decrypted. In an embodiment, the decrypted disk is utilized in generating an inspectable disk. In some embodiments, the encrypted disk is decrypted by executing an instruction initiated by an inspector account utilizing the decryption key accessed from the KMS, access to which was previously provided to the inspector account.

At S330, an inspectable disk is generated based on the decrypted disk. In certain embodiments, generating an inspectable disk includes generating a clone, a copy, a snapshot, and the like, based on the decrypted disk. In an embodiment the instruction for generating the inspectable disk is initiated by the inspector account.

At S340, access to the inspectable disk is provided to an inspector. In an embodiment, providing access to an inspector includes providing access to the inspectable disk to a service account (e.g., inspector account) which is configured to be assumed by an inspector workload.

In an embodiment, providing access includes sending a copy, a pointer of a clone, a snapshot, and the like, from the inspector account to the inspecting environment over a secure communication channel, such as a secure shell (SSH) communication.

At S350, a volume is generated from the inspectable disk. In an embodiment, a software container cluster is configured to provision a storage, into which a volume is generated based on the inspectable disk.

At S360, an instruction is generated to inspect the volume. In an embodiment, the volume is inspected for cybersecurity objects. In some embodiments, inspection includes searching the volume for files, text, regular expressions (regex), secrets, keys, application identifiers, malware signatures, virtual workloads, misconfigurations, combinations thereof, and the like.

Figure 4:
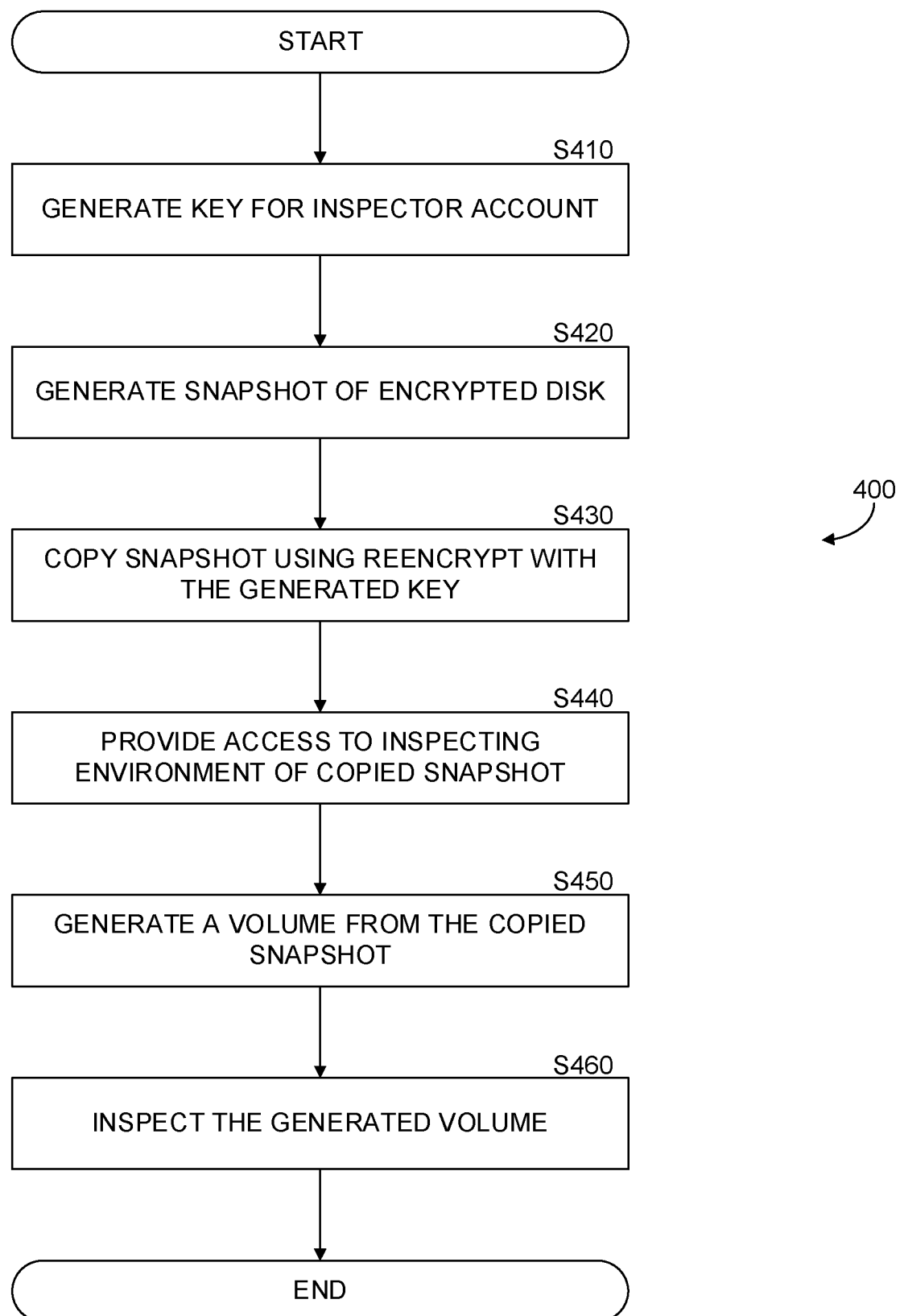
FIG. 4 is a flowchart of a method for disk decryption utilizing a default key for security risk inspection, implemented in accordance with an embodiment.

FIG. 4 is an example flowchart 400 of a method for disk decryption utilizing a default key for detecting cybersecurity objects, implemented in accordance with an embodiment. In certain cloud infrastructures, such as AWS, default keys do not support changing of an attached security policy.

At S410, a key is generated for an inspector account. In an embodiment, the key is generated to allow cross account access, with permissions for the inspector account. For example, an encrypted disk is selected, and a key is generated for the inspector account, to allow the inspector account to access the encrypted disk, according to an embodiment. In some embodiments, the inspector account is a service account which is configured to be assumed by an inspector workload.

At S420, a snapshot is generated of the encrypted disk. In an embodiment, generating the snapshot is performed based on executing an instruction initiated by an inspector account. In certain embodiments, the snapshot is a block-based copy of the encrypted disk at a particular point in time.

At S430, the snapshot is copied with a reencrypt command. Copying a snapshot includes, in an embodiment, executing a CopySnapshot instruction with a ReEncrypt instruction, where reencryption is performed with the generated key. In an embodiment, the instructions are provided by the inspector account, which has kms:CreateGrant and kms:ReEncryptFrom permissions from the KMS.

At S440, access is provided to the copied snapshot. In an embodiment, access is provided to an inspecting cloud environment, such as the inspecting cloud environment 104 of FIG. 1 above, and specifically to an inspector, for example by providing authorization to an inspector account to access the copied snapshot. In an embodiment, the copied snapshot is decrypted using the generated key for the inspector account. The key is provided to the inspector account, according to some embodiments.

At S450, a volume is generated from the copied snapshot. In an embodiment, a software container cluster is configured to provision a storage space, into which a volume is generated based on the copied snapshot of the decrypted disk.

At S460, the generated volume is inspected for a cybersecurity object. In an embodiment, inspection includes searching the volume for a file, a text, a regular expression (regex), a secret, a key, a certificate, a virtual workload, a combination thereof, and the like.

Figure 5:
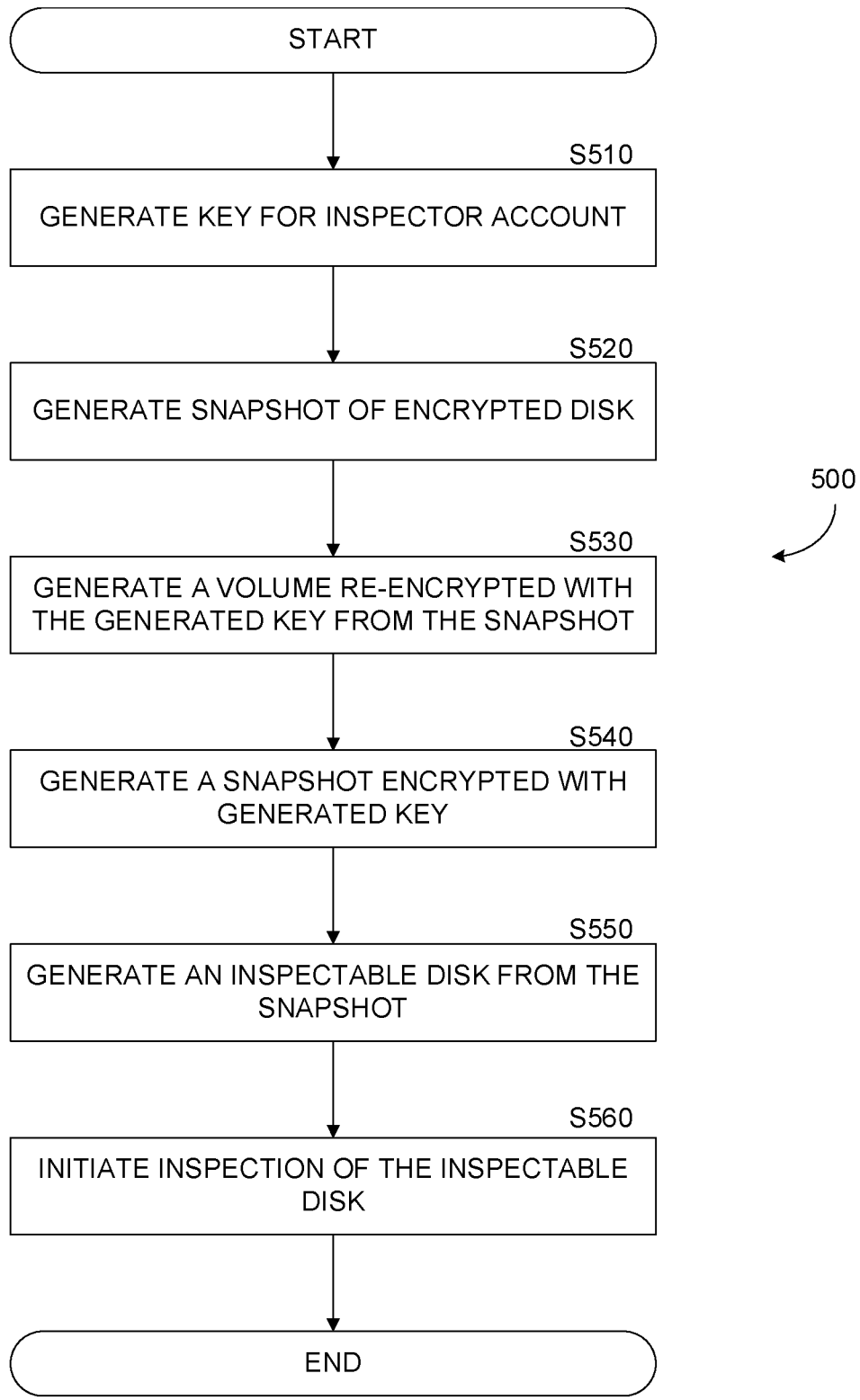
FIG. 5 is a flowchart of a method for reducing use of snapshot copy operations in cybersecurity inspection, implemented in accordance with an embodiment.

FIG. 5 is a flowchart of a method for reducing use of snapshot copy operations in cybersecurity inspection, implemented in accordance with an embodiment. In some embodiments, operations such as CopySnapshot in an Amazon® Web Services (AWS) environment are limited, restricted, and the like, for example, to a certain number of operations in a given time frame, to a given number of concurrent operations of a first type, a combination thereof, and the like. It is therefore advantageous to provide an alternate method to reduce use of limited operations.

At S510, a key is generated for an inspector account. In an embodiment, the key is generated to allow cross account access, with permissions for the inspector account. For example, an encrypted disk is selected, and a key is generated for the inspector account, to allow the inspector account to access the encrypted disk, according to an embodiment. In some embodiments, the inspector account is a service account which is configured to be assumed by an inspector workload.

At S520, a snapshot is generated of an encrypted disk. In an embodiment, the snapshot is stored in a cloud computing environment which is not an inspection environment. In certain embodiments, an instruction which when executed configures a cloud computing environment to generate a snapshot of an encrypted disk, is initiated by an inspector, and inspection controller, and the like.

In an embodiment, the snapshot is encrypted with a key, such as an asymmetric cryptographic encryption key. In some embodiments, the snapshot is encrypted with the same key as the encrypted disk, which the inspection environment does not have access to. In an embodiment, a key which the inspection environment does not have access to is a key which is inaccessible to an inspector, an inspector controller, a principal, a resource, and the like, of an inspection environment.

At S530, a volume is generated with a second key. According to an embodiment, the volume is generated by initiating an instruction in a cloud computing environment which generate a volume which is re-encrypted using the generated key. In certain embodiments, the volume is generated based on the encrypted snapshot.

In some embodiments, the volume is generated utilizing kms:CreateGrant in order to generate a key with a policy which allows access to a KMS key for an inspector (or other principal of the inspection environment), and kms:ReEncryptFrom, which allows to change the first key from the KMS which the inspection environment does not have access to, to the generated key which the inspection environment does have access to (i.e., via execution of the kms:CreateGrant command).

At S540, a snapshot is generated from the re-encrypted volume. In an embodiment, the snapshot is stored in a cloud computing environment which is not an inspection environment. In certain embodiments, an instruction which when executed configures a cloud computing environment to generate a snapshot of the re-encrypted volume, is initiated by an inspector, and inspection controller, and the like.

In an embodiment, the snapshot is encrypted with a key, such as an asymmetric cryptographic encryption key. In some embodiments, the snapshot is encrypted with the same key as the re-encrypted volume, which the inspection environment has access to.

At S550, an inspectable disk is initiated from the snapshot. In an embodiment, initiating an inspectable disk includes generating a snapshot from the re-encrypted volume, and generating an inspectable disk (e.g., a decrypted disk) based on the generated snapshot.

At S560, inspection of the inspectable disk is initiated. In an embodiment, a generated volume (e.g., an inspectable disk) is inspected for a cybersecurity object. In an embodiment, inspection includes searching the inspectable disk for a file, a text, a regular expression (regex), a secret, a key, a certificate, a virtual workload, a malware, a misconfiguration, an exposure, a vulnerability, a combination thereof, and the like.

Figure 6:
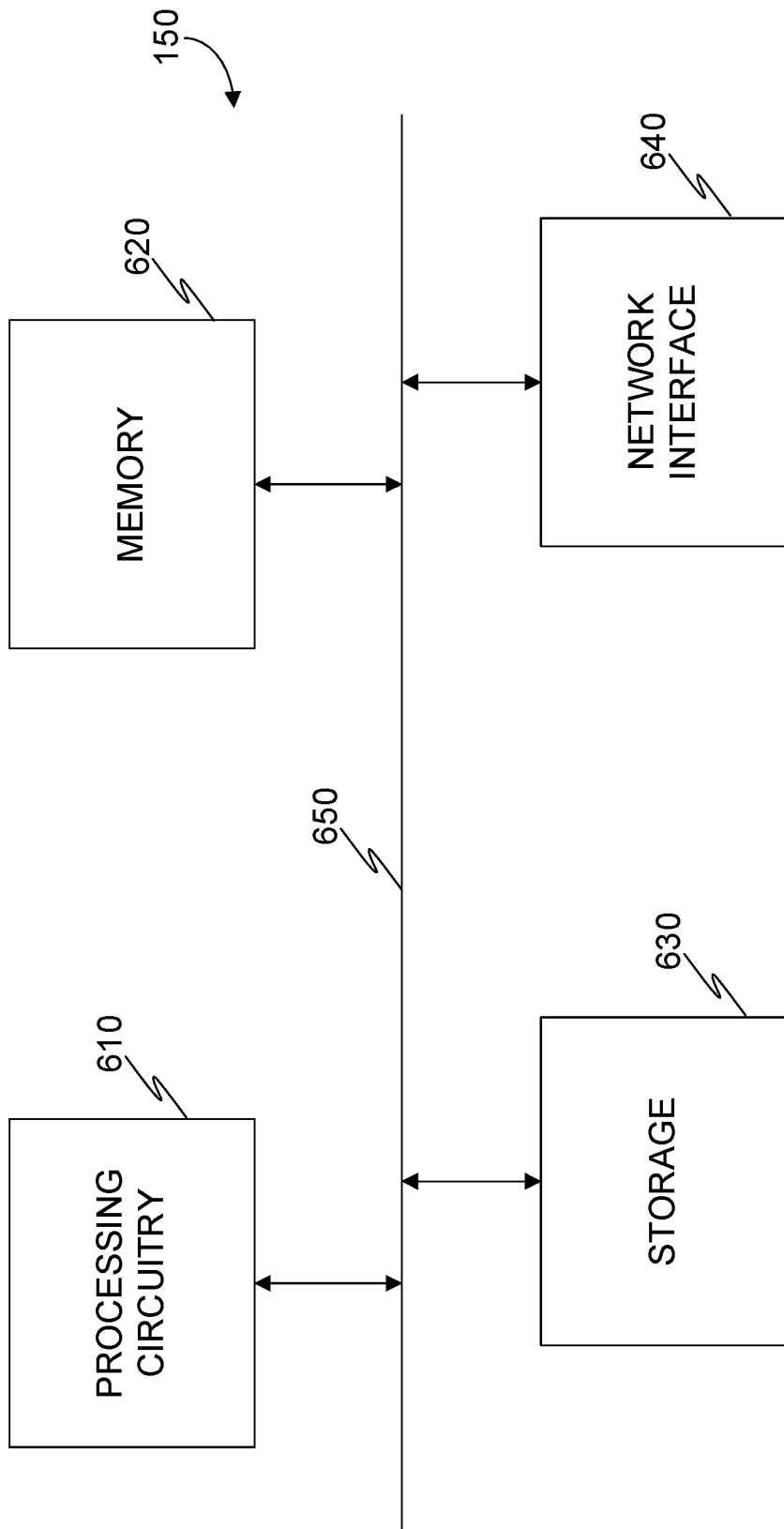
FIG. 6 is a schematic diagram of a system configured to execute an inspector according to an embodiment.

FIG. 6 is an example schematic diagram of an inspector 150 according to an embodiment. The inspector 150 includes a processing circuitry 610 coupled to a memory 620, a storage 630, and a network interface 640. In an embodiment, the components of the inspector 150 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof. In an embodiment, the memory 620 is an on-chip memory, an off-chip memory, a combination thereof, and the like. In certain embodiments, the memory 620 is a scratch-pad memory for the processing circuitry 610.

In one configuration, software for implementing one or more embodiments disclosed herein may be stored in the storage 630, in the memory 620, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 640 is configured to provide the inspector 150 with communication with, for example, the inspector account 130, the container cluster 160, and the like.

It should be understood that the embodiments described herein are not limited to the specific architecture illustrated in FIG. 6, and other architectures may be equally used without departing from the scope of the disclosed embodiments.

Furthermore, in certain embodiments the virtual workload 110, the database 170, and the like, may be implemented with the architecture illustrated in FIG. 6. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for reducing use of restricted operations in a cloud computing environment during cybersecurity threat inspection, comprising:
   detecting an encrypted disk in a cloud computing environment, the encrypted disk encrypted utilizing a first key in a key management system (KMS);
   generating a second key in the KMS, the second key providing access for a principal of an inspection environment;
   generating a snapshot of the encrypted disk;
   generating a volume based on the snapshot of the encrypted disk, wherein the volume is re-encrypted with the second key;
   generating a snapshot of the re-encrypted volume;
   generating an inspectable disk from the snapshot of the re-encrypted volume; and
   initiating inspection for a cybersecurity object on the inspectable disk.

2. The method of claim 1, further comprising:
   determining that the encrypted disk is encrypted based on metadata associated with the encrypted disk.

3. The method of claim 1, further comprising:
   associating the second key with a principal of an inspection environment.

4. The method of claim 1, further comprising:
   inspecting the inspectable disk for any one of: a file, a text, a regular expression (regex), a secret, a key, a certificate, a virtual workload, and any combination thereof.

5. The method of claim 1, further comprising:
   generating the second key utilizing any instruction of: kms:CreateGrant, kms:CreateKey, kms:PutKeyPolicy, and any combination thereof.

6. The method of claim 1, further comprising:
   generating volume utilizing any instruction of: kms:ReEncryptFrom, kms:ReEncryptTo, and any combination thereof.

7. The method of claim 1, further comprising:
   generating a decrypted inspectable disk, based on the second key.

8. The method of claim 1, wherein the generated snapshot is encrypted with the first key.

9. A non-transitory computer-readable medium storing a set of instructions for reducing use of restricted operations in a cloud computing environment during cybersecurity threat inspection, the set of instructions comprising:
- one or more instructions that, when executed by one or more processors of a device, cause the device to:
- detect an encrypted disk in a cloud computing environment, the encrypted disk encrypted utilizing a first key in a key management system (KMS);
- generate a second key in the KMS, the second key providing access for a principal of an inspection environment;
- generate a snapshot of the encrypted disk;
- generate a volume based on the snapshot of the encrypted disk, wherein the volume is re-encrypted with the second key;
- generate a snapshot of the re-encrypted volume;
- generate an inspectable disk from the snapshot of the re-encrypted volume; and
- initiate inspection for a cybersecurity object on the inspectable disk.

10. A system for reducing use of restricted operations in a cloud computing environment during cybersecurity threat inspection comprising:
- a processing circuitry; and
- a memory, the memory containing instructions that, when executed by the processing circuitry, configure the system to:
- detect an encrypted disk in a cloud computing environment, the encrypted disk encrypted utilizing a first key in a key management system (KMS);
- generate a second key in the KMS, the second key providing access for a principal of an inspection environment;
- generate a snapshot of the encrypted disk;
- generate a volume based on the snapshot of the encrypted disk, wherein the volume is re-encrypted with the second key;
- generate a snapshot of the re-encrypted volume;
- generate an inspectable disk from the snapshot of the re-encrypted volume; and
- initiate inspection for a cybersecurity object on the inspectable disk.

11. The system of claim 10, wherein the memory contains further instructions which when executed by the processing circuitry further configure the system to:
- determine that the encrypted disk is encrypted based on metadata associated with the encrypted disk.

12. The system of claim 10, wherein the memory contains further instructions which when executed by the processing circuitry further configure the system to:
- associate the second key with a principal of an inspection environment.

13. The system of claim 10, wherein the memory contains further instructions which when executed by the processing circuitry further configure the system to:
- inspect the inspectable disk for any one of: a file, a text, a regular expression (regex), a secret, a key, a certificate, a virtual workload, and any combination thereof.

14. The system of claim 10, wherein the memory contains further instructions which when executed by the processing circuitry further configure the system to:
- generate the second key utilizing any instruction of: kms:CreateGrant, kms:CreateKey, kms:PutKeyPolicy, and any combination thereof.

15. The system of claim 10, wherein the memory contains further instructions which when executed by the processing circuitry further configure the system to:
- generate the volume utilizing any instruction of: kms:ReEncryptFrom, kms:ReEncryptTo, and any combination thereof.

16. The system of claim 10, wherein the memory contains further instructions which when executed by the processing circuitry further configure the system to:
- generate a decrypted inspectable disk, based on the second key.

17. The system of claim 10, wherein the generated snapshot is encrypted with the first key.

* * * * *